(12) United States Patent
Matsumoto et al.

(10) Patent No.: US 7,010,971 B2
(45) Date of Patent: Mar. 14, 2006

(54) HEATING RESISTOR TYPE FLOW-MEASURING DEVICE HAVING A HEATING RESISTOR AND A THERMORESISTANCE, WHOSE RESISTANCE VALUE VARIES IN RESPONSE TO THE AMBIENT TEMPERATURE

(75) Inventors: Masahiro Matsumoto, Hitachi (JP); Masamichi Yamada, Hitachinaka (JP); Hiroshi Nakano, Hitachi (JP); Izumi Watanabe, Hitachinaka (JP); Keiji Hanzawa, Mito (JP); Ryo Sato, Hitachinaka (JP)

(73) Assignees: Hitachi Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

(21) Appl. No.: 10/921,206

(22) Filed: Aug. 19, 2004

(65) Prior Publication Data

US 2005/0120789 A1  Jun. 9, 2005

(30) Foreign Application Priority Data

Dec. 8, 2003  (JP)  ............................. 2003-409140

(51) Int. Cl.
*G01F 1/68* (2006.01)
(52) U.S. Cl. ................................. 73/204.15; 73/204.26
(58) Field of Classification Search ............. 73/204.15, 73/204.24, 204.25, 204.26
See application file for complete search history.

(56) References Cited

U.S. PATENT DOCUMENTS

| 4,214,478 A | * | 7/1980 | Lauterbach | ............... 73/204.15 |
| 4,344,322 A | * | 8/1982 | Plapp | ...................... 73/204.15 |
| 4,450,719 A | * | 5/1984 | Nishimura et al. | ...... 73/204.15 |
| 5,036,702 A | * | 8/1991 | Akamatsu et al. | ........ 73/204.15 |

FOREIGN PATENT DOCUMENTS

| DE | 10012309 | 4/2001 |
| EP | 1227304 | 7/2002 |
| JP | 61-057819 | 3/1986 |
| JP | 09-005284 | 1/1997 |
| JP | 2000-314645 | 11/2000 |
| JP | 2002 310758 | 10/2002 |
| JP | 2002-310762 | 10/2002 |

* cited by examiner

*Primary Examiner*—Harshad Patel
(74) *Attorney, Agent, or Firm*—Mattingly, Stanger, Malur & Brundidge, P.C.

(57) ABSTRACT

A heating resistor type flow-measuring device is capable of adjusting heating temperature of a heating resistor according to the ambient temperature as well as making the initial adjustment. A heating resistor, a thermoresistance, a group of the resistors, and an amplifier constitute a bridge circuit, and leading terminals of the group of resistors are connected to one of input terminals of an amplifier for amplifying an error voltage through MOS transistors. The heating temperature of the heating resistor can be changed by selecting one of the MOS transistors and turning it on.

9 Claims, 7 Drawing Sheets

HEATING RESISTOR TYPE FLOW-MEASURING DEVICE HAVING A HEATING RESISTOR AND A THERMORESISTANCE, WHOSE RESISTANCE VALUE VARIES IN RESPONSE TO THE AMBIENT TEMPERATURE

FIELD OF THE INVENTION

The present invention relates to a heating resistor type flow-measuring device and more particularly to a heating resistor type flow-measuring device capable of easily adjusting the temperature of a heating resistor based on digital information.

BACKGROUND OF THE INVENTION

There is an air flowmeter as an example of the heating resistor type flow-measuring device. This air flowmeter comprises: a heating resistor (heater); a current control circuit (feedback control using a bridge circuit) for maintaining the temperature of this heating resistor to a constant temperature; a temperature sensor disposed near the heating resistor, and a thermoresistance whose resistance value changes in response to the ambient temperature (a flow sensor described in the patent document 1, and a heater drive circuit described in the patent document 2).

[Patent document 1] JP-A No. 310762/2002

[Patent document 2] JP-A No. 314645/2000

Generally, in the heating resistor type flow-measuring device, heating temperature of the heating resistor needs to be initially adjusted.

In a technology disclosed in the patent documents 1, in order to adjust the temperature of a heating resistor, resistance values of bridge resistors that constitute the bridge circuit together with the heating resistor is adjusted, and in order to adjust the resistance value of the bridge circuit, the technology adopts a method of changing connection of resistor pattern by wire bonding.

If the technology can adjust the heating temperature when the ambient temperature rises to reach a temperature causing large aging (for example, 350° C.), in addition to its capability of initial adjustment, it will be convenient.

However, with the technology disclosed in the patent document 1, the initial adjustment of the heating resistor is cumbersome and requires a lot of time, and in addition, after the initial adjustment of the heating resistor, it is difficult to alter the heating temperature properly according to a change in the ambient temperature.

On the other hand, in the heater drive circuit described in the patent document 2, in order to adjust the temperature of the heating resistor (heater), one of bridge resistors that constitute a bridge circuit together with the heating resistor is chosen to be a variable resistor and the resistance value of this variable resistor is adjusted.

Figure 8:
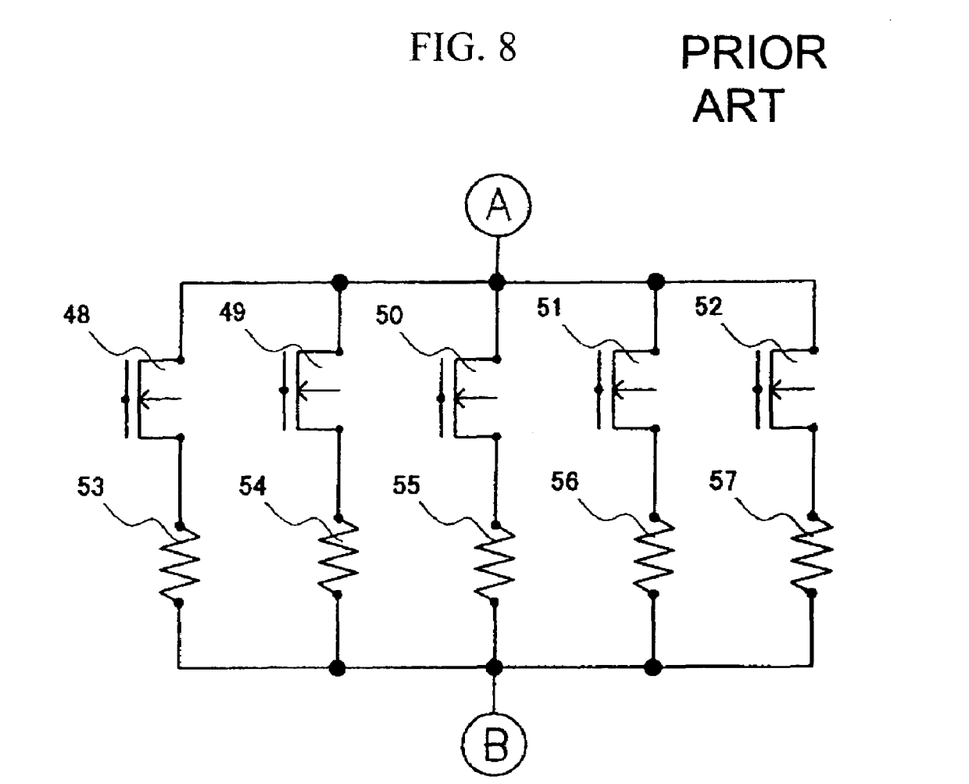
FIG. 8 is an example different from the present invention, being a block diagram of a circuit between terminals A and B in the case where a resistance value of a bridge circuit is changed.

When adjusting the resistance value of this variable resistor based on digital information, it is conceivable to apply a circuit configuration as shown in FIG. 8.

That is, the variable resistor circuit shown in FIG. 8 is configured in such a way that resistors 53, 54, 55, 56, 57 each of which is connected to MOS transistors 48, 49, 50, 51, 52, respectively to form a plurality of serially-connected elements of a resistor and a MOS transistor, which are then connected to one another in parallel between the terminal A and terminal B.

Then, by turning these MOS transistors 48, 49, 50, 51, 52 ON or OFF based on digital information, a combined resistance between terminals A and B can be changed.

However, in order to adjust the temperature of the heating resistor with high precision, it is necessary to alter the combined resistance of the circuit whose configuration is shown in FIG. 8 by the unit of several ohms. For this reason, it is necessary to set ON resistance values of the MOS transistors 48, 49, 50, 51, and 52 to several ohms or less. However, for this purpose, the sizes of the MOS transistors 48, 49, 50, 51, 52 need to be increased, and consequently the heating resistor type flow-measuring device becomes large and heavy in weight. In the case where this variable resistor circuit is implemented in an integrated circuit, extremely large chip size is required.

Because of this, it is difficult to attain small size and lightweight and to adjust the heating temperature of the heating resistor according to the ambient temperature as well as making the initial adjustment.

SUMMARY OF THE INVENTION

The object of the present invention is to realize a small-sized and lightweight heating resistor type flow-measuring device that is yet capable of adjusting the heating temperature of the heating resistor according to the ambient temperature as well as making the initial adjustment.

In order to attain the object, the heating resistor type flow-measuring device according to the present invention is configured as follows.

That is, in the heating resistor type flow-measuring device, a resistance ratio of the bridge circuit that is comprised of a heating resistor, a thermoresistance, and a group of fixed resistors is changed by means of switching elements, whereby resistance components of the switching elements are evaded being constituent resistors of the bridge circuit.

Thereby, a small-sized switching element whose resistance is large can be applied to the heating resistor type flow-measuring device.

According to the present invention, a small-sized and lightweight heating resistor type flow-measuring device that is yet capable of adjusting the heating temperature of the heating resistor according to the ambient temperature as well as making the initial adjustment can be realized.

DETAILED DESCRIPTION OF THE PREFERRED EMBODIMENTS

Hereafter, a preferred embodiment of the present invention will be described referring to the accompanying drawings.

Note that an example that will be described below is an example in which the present invention is applied to an air flowmeter.

Figure 1:
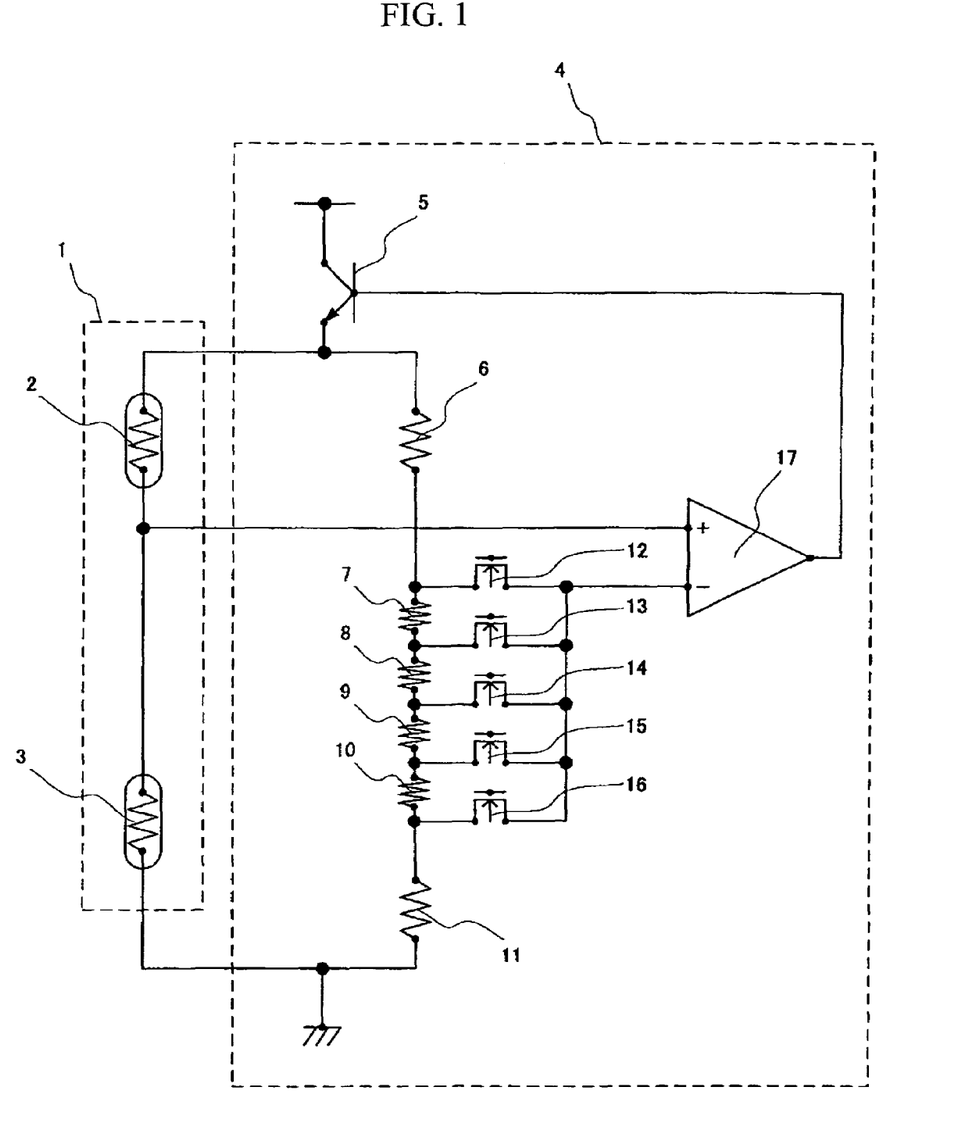
FIG. 1 is a block diagram of a drive circuit of a heating resistor of the air flowmeter that is a first embodiment of the present invention.

First of all, an air flowmeter that is the first embodiment of the present invention will be described referring to FIGS. 1 to 5. FIG. 1 is a sectional view of the drive circuit of a heating resistor 2 of the air flowmeter that is the first embodiment, FIG. 2 is a plan view of a sensor element 1 of the air flowmeter of the first embodiment, and FIG. 3 is a sectional view of the sensor element 1 of the air flowmeter of the first embodiment taken along with line A–A' of FIG. 2.

First, a configuration of the sensor element 1 of the air flowmeter shown in FIG. 1 will be described referring to FIGS. 2 and 3.

Figure 2:
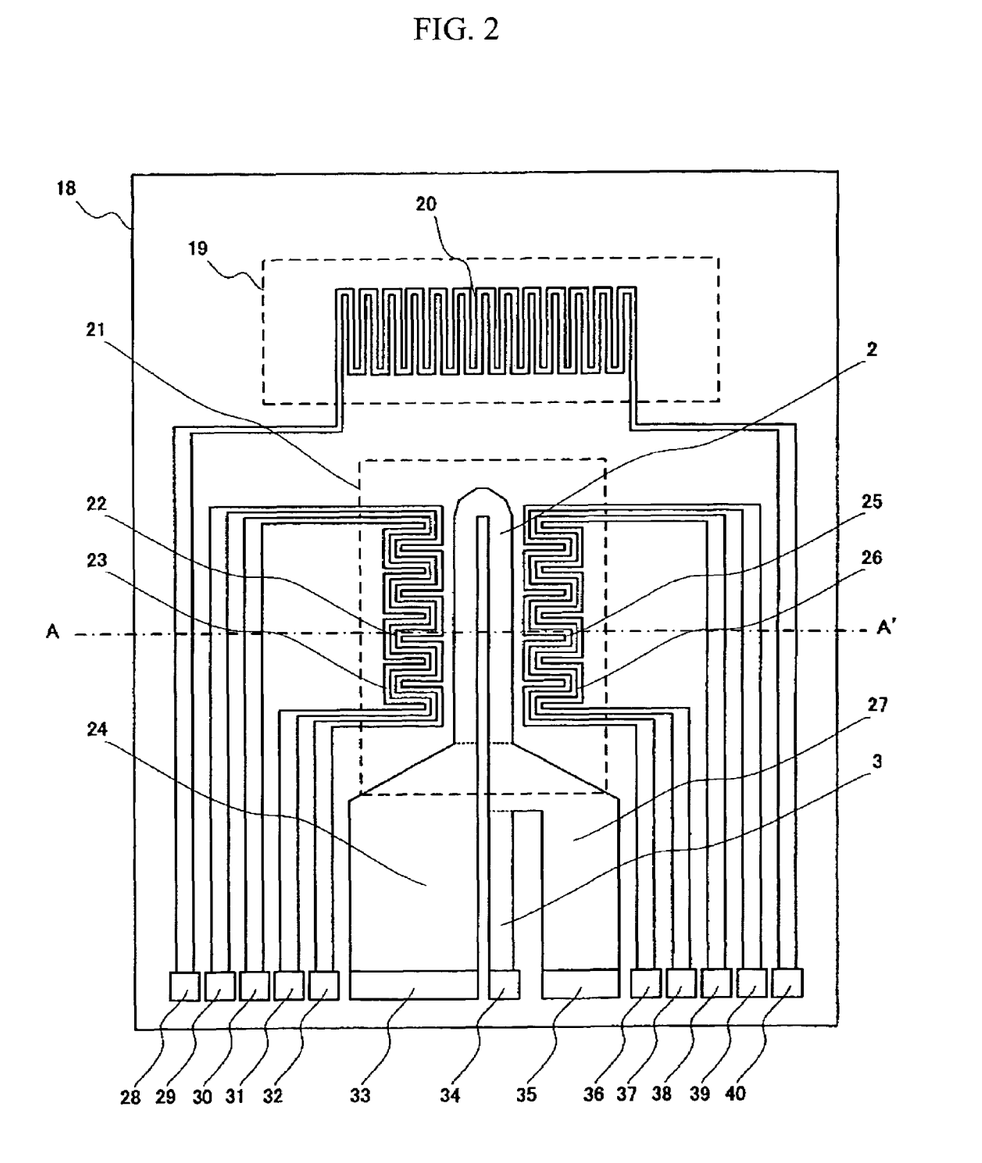
FIG. 2 is a plan view of a sensor element of the air flowmeter that is the first embodiment.
Figure 3:
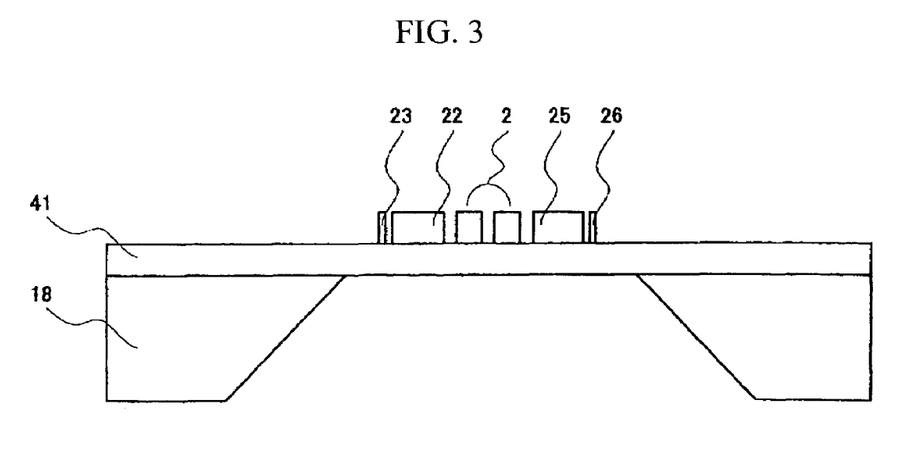
FIG. 3 is a sectional view of the sensor element of the air flowmeter that is the first embodiment.

In FIG. 2 and FIG. 3, the sensor element 1 has a planar substrate 18 made of a material of excellent thermal conductivity, such as ceramics and silicon. Then, an insulating film 41 is formed on this planar substrate 18, and the planar substrate is etched from its back side to from a space under the insulating film 41, whereby thin parts (diaphragms) 19, 21 are formed in the planar substrate 18.

On the surface of the thin part 21, the heating resistor 2 that will be heated to a temperature making a constant temperature difference with the temperature of air flow to be measured is formed. Further, both temperature sensors 22, 23 and temperature sensors 25, 26 are formed on the both sides of this heating resistor 2.

More specifically, the heating resistor 2 is a resistor made from a polysilicon thin film or a platinum thin film, and will generate heat when a current is made to flow therein. The resistance value thereof varies in response to its heating temperature. The temperature sensors 22, 23, 25, 26 are also resistors made from a polysilicon thin film or a platinum thin film, and their resistance values will vary by a change in their temperature.

That is, the air flowmeter in the present invention measures the flow rate of air based on the following procedure: the heating resistor 2 is heated in advance to a temperature that makes a constant temperature difference with air temperature of an air flow to be measured, and a change in the temperature of the heating resistor 2 caused by the air flow is detected by the temperature sensor (upwind or downwind) 22, 23 and the temperature sensor (downwind or upwind) 25, 26 by using a phenomenon that, when air flows in the air flowmeter, the upwind temperature of the heating resistor 2 decreases, and the downwind temperature increases. In a short, based on the heating temperature of the heating resistor 2, the flow rate of the air is measured.

In addition, using a phenomenon that the temperature of the planar substrate 18 changes in response to the ambient temperature, the air flowmeter is configured to be capable of measuring the ambient temperature by a thermoresistance 3 provided on the planar substrate 18. Then, by detecting the ambient temperature using information obtained from the thermoresistance 3, the temperature of the heating resistor 2 is controlled to have a constant temperature difference to the ambient temperature.

Incidentally, the thermoresistance 3 is a resistor made from a polysilicon thin film or a platinum thin film, and measure the ambient temperature by the use of change in the resistance value resulting from a change in the temperature.

In order to measure intake air temperature, the intake-air temperature sensor 20 is formed on the surface of the thin part 19. Here, the intake-air temperature sensor 20 is a resistor made from a polysilicon thin film or a platinum thin film, and serves as a sensor for measuring the intake-air temperature by the use of change in the resistance value caused by a change in the temperature.

The heating resistor 2, the temperature sensors 22, 23, 25, 26, the thermoresistance 3, and the intake-air temperature sensor 20 are connected to pads 28 to 40 so as to be capable of being connected to the outside of the substrate 18.

The heating resistor 2 and the thermoresistance 3 are connected in series by a wiring pattern 27 on the planar substrate 18, and a junction point of the heating resistor 2 and the thermoresistance 3 is connected to a pad 35 through the wiring pattern 27.

The heating resistor 2 is connected to a pad 33 through a wiring pattern 24.

Next, a drive circuit of the heating resistor 2 will be described referring to FIG. 1.

In FIG. 1, the drive circuit in the first embodiment of the present invention comprises the heating resistor 2 and the thermoresistance 3 both arranged on the sensor element 1, the thermoresistance 3 being serially-connected to this heating resistor 2. The drive circuit is disposed on an integrated circuit 4, which comprises a driving transistor 5 for driving the heating resistor 2, and a group of resistors (serially-connected resistors 6, 7, 8, 9, 10, 11) that is connected in parallel to a circuit consisting of the serially-connected heating resistor 2 and thermoresistance 3, the emitter of the transistor 5 being connected to the heating resistor 2. The drive circuit further comprises MOS transistors 12, 13, 14, 15, and 16 connected to leading terminals of the group of the resistors (junction points of the resistors 6 to 11) and amplifiers for amplifying an error voltage of a bridge circuit consisting of the heating resistor 2, the thermoresistance 3, and the group of the resistors.

The source or drain of each of the MOS transistors 12 to 16 is connected to an inverting input terminal of an amplifier 17. The drain or source of the MOS transistor 12 is connected to a junction point of the resistors 6 and 7 (leading terminal), and the drain or source of the MOS transistor 13 is connected to a junction point of the resistors 7 and 8 (leading terminal). Similarly, the drain or source of the MOS transistor 14 is connected to a junction point of the resistors 8 and 9 (leading terminal), the drain or source of the MOS transistor 15 is connected to a junction point of the resistors 9 and 10 (leading terminal), and the drain or source of the MOS transistor 16 is connected to a junction point of the resistors 10 and 11 (leading terminal). That is, any one of resistive junction points of the plurality of resistors 6 to 11 is connected to the inverting input terminal through the MOS transistor connected to the junction point so that the potential (a second potential) of the resistive junction point becomes an input signal to the amplifier 17.

On the other hand, the junction point between the heating resistor 2 and the thermoresistance 3 is connected to a non-inverting input terminal of the amplifier 17. That is, that junction point is connected to the non-inverting input terminal so that the potential at the junction point between the heating resistor 2 and the thermoresistance 3 (a first potential) becomes an input signal to the amplifier 17. Then an output signal of this amplifier 17 is fed to the base of the driving transistor 5.

In the driving current shown in FIG. 1, a current flowing in the heating resistor 2 is controlled until the error voltage of the bridge circuit consisting of the heating resistor 2, the thermoresistance 3, and the group of the resistors 6 to 11 becomes zero, whereby the heating temperature is adjusted.

Therefore, the heating temperature of the heating resistor 2 can be changed by turning on a MOS transistor among the MOS transistors. That is, the temperature of the heating resistor 2 can be adjusted by selecting a MOS transistor among the MOS transistors 12, 13, 14, 15 based on digital information calculated by an arithmetic unit 47 of the integrated circuit 4 that will be described later. Note that the arithmetic unit 47 is configured to be able to output on/off signals for the MOS transistors 12, 13, 14, 15, 16.

In the drive circuit of this invention, since the plurality of MOS transistors are used for adjustment of a ratio of resistors in the bridge circuit, and the MOS transistors are evaded serving by themselves as a part of the group of the resistors that constitute the bridge circuit, a current hardly flows in the MOS transistors 12, 13, 14, 15, 16. Therefore, if the MOS transistors 12 to 16 have large ON resistance values, they hardly affect adjustment of resistance values in the bridge circuit. Therefore, the MOS transistors may be formed in small sizes, and consequently if they are mounted in the integrated circuit 4, the integrated circuit 4 can be manufactured in a small size.

Moreover, a method, as in the driving circuit of the present invention, in which leading terminals are provided at midpoints of the group of the resistors that are connected in series, and any terminal is selected among these leading terminals and connected to the inverting terminal of the amplifier 17 can be actually configured only in the case where the heating resistor 2 and the thermoresistance 3 are connected in series.

This is because, in the case where the heating resistor 2 and the thermoresistance 3 are connected in parallel, the leading terminal serves as a junction point to the ground, a current will flow in this junction point, and hence the MOS transistor cannot be made small in size.

Note that in a drive circuit according to the present invention, it is necessary to suppress temperature rise due to self-heating of the thermoresistance 3 as less as possible. This is because, when the temperature of thermoresistance 3 rises, the temperature of the heating resistor 2 will rise by the same amount.

Because of this, in almost all the air flowmeters in the conventional technology, the heating resistor 2 and the thermoresistance 3 are connected in parallel to increase the resistance value of the thermoresistance 3, and consequently the self-heating of the thermoresistance 3 is intended to be suppressed.

However, when forming the heating resistor 2 and the thermoresistance 3 on the planar substrate 18 in the first embodiment, generally the thermoresistance 3 and the heating resistor 2 are made of the same material. Because of this, if the resistance value of the thermoresistance 3 is increased, a mounting area of the thermoresistance 3 will increase in size, and the chip size of the planar substrate 18 will become large.

On the other hand, in the case of the thermoresistance 3 having a bad structure in terms of heat dissipation, such as a hot-wire type air flowmeter, it is impossible to connect the heating resistor 2 and the thermoresistance 3 to each other in series. This is because when the heating resistor 2 and the thermoresistance 3 are connected in series, the same current that flows in the heating resistor 2 also flows in the thermoresistance 3; therefore, it is difficult to reduce the self-heating of the thermoresistance 3, and consequently the temperature of the thermoresistance will rise.

Moreover, when the heating resistor 2 and the thermoresistance 3 are connected in series, in order to suppress the self-heating of the thermoresistance 3, it is necessary to reduce the resistance value of the thermoresistance 3. However, if the resistance value of the thermoresistance 3 is made small, the degree by which the error voltage of the bridge circuit consisting of the heating resistor 2, the thermoresistance 3, and the group of the resistors 6 to 11 changes in response to the heating temperature of the heating resistor 2 will fall.

In addition, when the resistance value of the thermoresistance 3 becomes small, the common mode voltage of the amplifier 17 becomes small, and the amplifier 17 stops its operation. (It is often the case that air flowmeters used for automobile are operated with a single power supply. If the common mode voltage is small in the case where the amplifier 17 is operated with a single power supply, the amplifier 17 will not operate.)

In the light of the above facts, the planar substrate 18 is made of a material of excellent thermal conductivity, such as ceramics or silicon. In the case where the planar substrate 18 is constructed with a material of excellent thermal conductivity, the temperature rise of the thermoresistance 3 can be made sufficiently small even when the heating resistor 2 and the thermal resistor 3 are connected in series.

This is primarily because when the heating resistor 2 printed on the planar substrate 18 is used for an air flowmeter, generally consumption current of the heating resistor 2 is small, and secondarily because when the planar substrate 18 is constructed with a material of excellent thermal conductivity, such as ceramics and silicon, the thermoresistance 3 hardly exhibits temperature rise even when the self-heating of the thermoresistance 3 is the same.

Here, a configuration in which the group of the resistors 6 to 11 is arranged on the planar substrate 18 is conceivable. This configuration has a drawback that heating of the group of the resistors 6 to 11 fill causes the temperature rise of the planar substrate 18, resulting in occurrence of an error when the thermoresistance 3 detects the ambient temperature. This configuration requires also a pad for allowing the leading terminal to be extracted to the outside of the planar substrate 18, which increases a chip size of the planar substrate 18.

Therefore, the configuration in which the group of the resistors 6 to 11 is arranged on the planar substrate 18 is not preferable.

Figure 4:
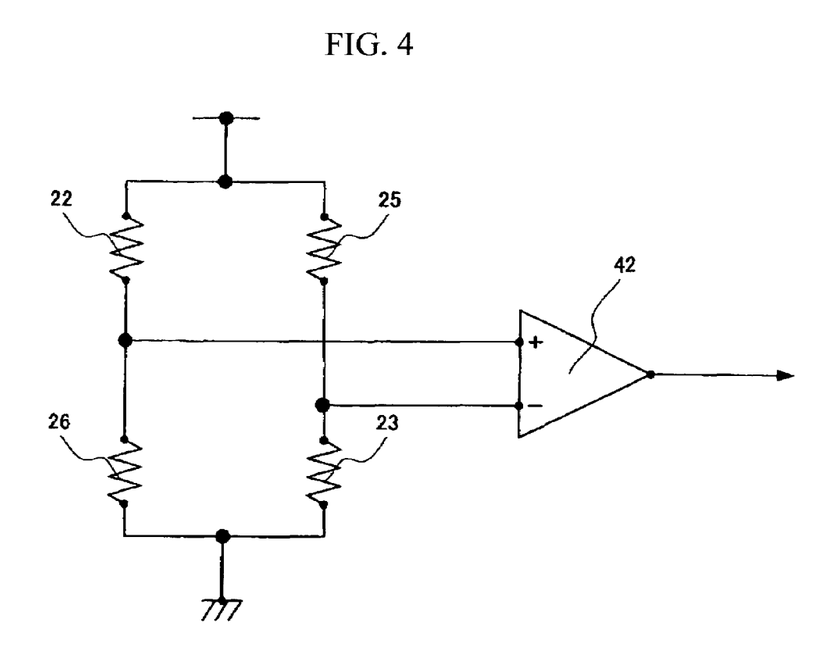
FIG. 4 is a block diagram of a temperature sensor detection circuit of the air flowmeter that is the first embodiment.

Next, a detection circuit of the temperature sensor will be described referring to FIG. 4. This FIG. 4 is a block diagram of the temperature-sensor detection circuit of the air flowmeter of the first embodiment. This temperature-sensor detection circuit is a bridge circuit that consists of the temperature sensors 22, 23, 25, 26 arranged on the sensor element 1. That is, the resistors 22 and 26 are connected to each other in series, and the resistors 25 and 23 are connected to each other in series. Further, the serially-connected resistors 22 and 26 and the serially-connected resistors 23 and 25 are connected to each other in parallel, the junction point between the resistors 22 and 26 is connected to the non-inverting input terminal of an amplifier 42, and the junction point between the resistors 25, 23 is connected to the inverting input terminal of the amplifier 42.

Then, the error voltage of this bridge circuit is amplified by the amplifier 42, and a signal responsive to the flow rate of air is outputted from the amplifier 42.

Figure 5:
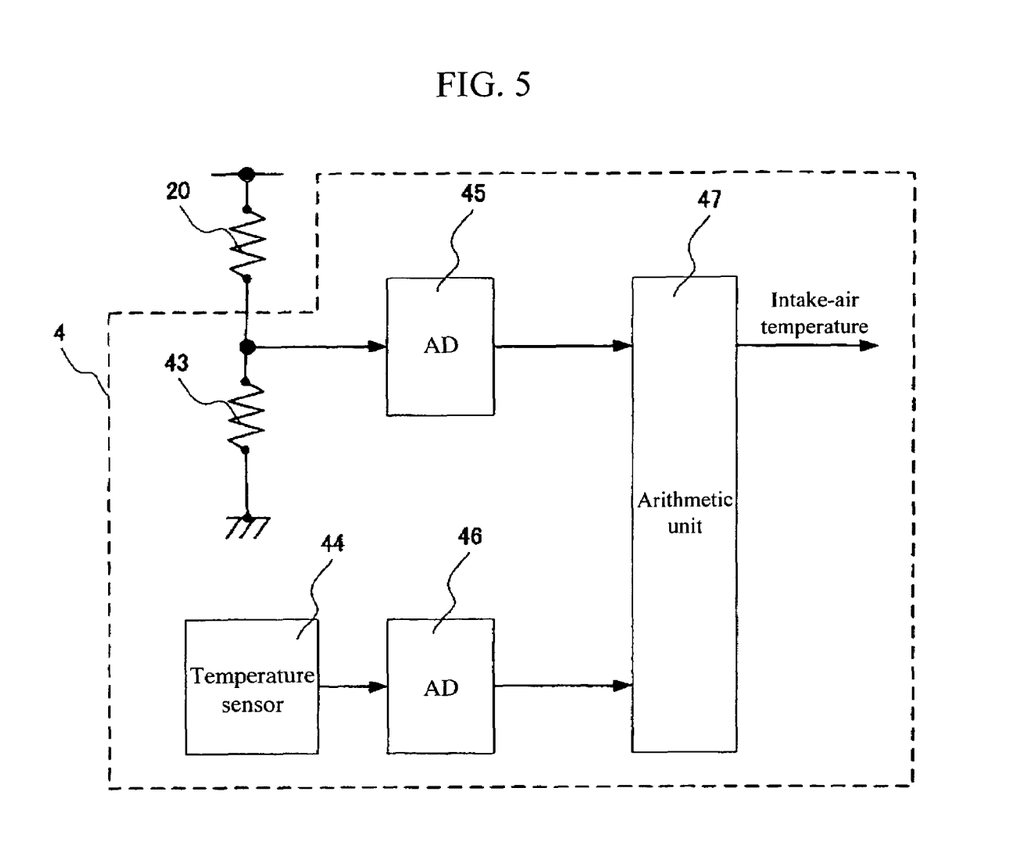
FIG. 5 is a block diagram of an intake-air temperature sensor detection circuit of the air flowmeter that is the first embodiment.

Next, a detection circuit of the intake-air temperature sensor will be described referring to FIG. 5. This FIG. 5 is a block diagram of the detection circuit of the intake-air temperature sensor in the air flowmeter of the first embodiment. This detection circuit of the intake-air temperature sensor has the intake-air temperature sensor 20 disposed in the sensor element 1, a resistor 43 that is disposed in the integrated circuit 4 and connected to the intake-air temperature sensor 20, constituting a half bridge together with this sensor 20, and an A/D converter 45 for analog-to-digital converting the output voltage of this half bridge.

Further, the detection circuit of this intake-air temperature sensor have a temperature sensor 44 for detecting the temperature of the integrated circuit, an AD converter 46 for analog-to-digital converting the output signal of the temperature sensor 44, and the arithmetic unit 47 for correcting the output signal of the A/D converter 45 using the output of the A/D converter 46.

The arithmetic unit 47 calculates the resistance value of the resistor 43 from the output signal of the temperature sensor 44, uses this calculated resistance value and the output value of the A/D converter 45 to calculate the resistance value of the intake-air temperature sensor 20, and then calculates the intake-air temperature from this calculation result.

At the same time, the arithmetic unit 47 judges which transistor among the MOS transistors 12 to 16 of the integrated circuit 4 should be turned ON from the temperatures of the intake air and of the integrated circuit in order to adjust the heating temperature of the heating resistor 2, and feeds ON/OFF signals to the MOS transistors 12 to 16.

Alternately, the initial adjustment of the resistance ratio of the bridge circuit can be executed by allowing the ON/OFF signals to be fed to the MOS transistors 12 to 16 through the arithmetic unit 47 on an instruction from a superordinate main controller (not shown in the figure).

Figure 6:
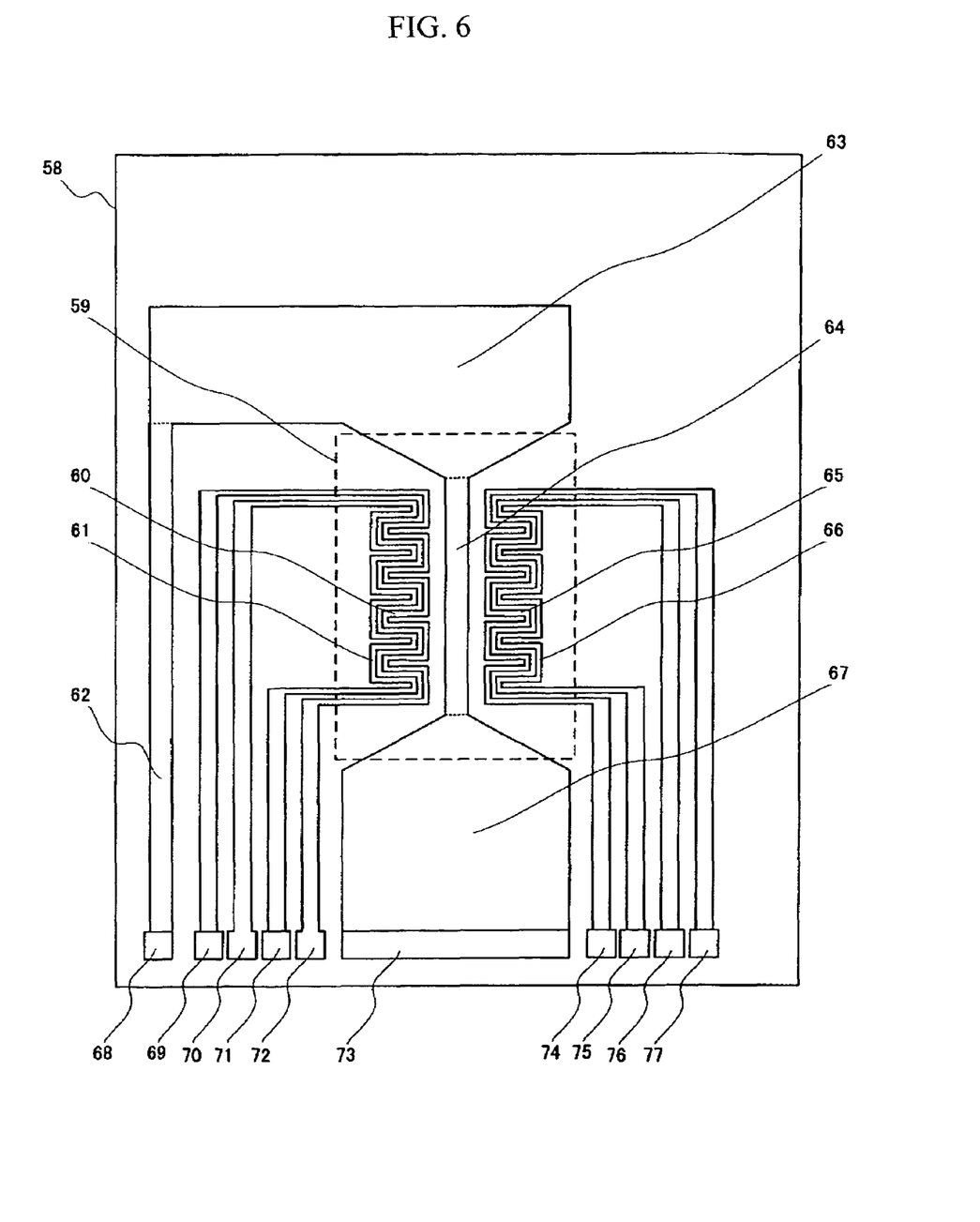
FIG. 6 is a plan view of an example of a variation of the sensor element of the air flowmeter that is the first embodiment.

Next, an example of a variation of the sensor element of the first embodiment of the present invention will be described referring to FIG. 6. FIG. 6 is a plan view of a variation of the sensor element of the first embodiment. Even if the sensor element arranged as shown in this FIG. 6 is used, the effect of the present invention can be achieved.

In FIG. 6, the sensor element is manufactured as follows: a thin part 59 is formed in the planar substrate 58 made of a material of excellent thermal conductivity, such as ceramics and silicon, a heating resistor 64 is formed on the surface of the thin part 59, and then the temperature sensors 60, 61, 65, 66 are formed on the both sides of the heating resistor 64.

Further a thermoresistance 62 for detecting the ambient temperature is located in the outermost peripheral of the planar substrate 58 with respect to other resistors so as not to be affected by the heating resistors 64. The heating resistor 64 and the thermoresistance 62 are connected to each other by the wiring pattern 63, and the heating resistor 64 is extracted to a pad 73 by the wiring pattern 67.

The thermoresistance 62 and the temperature sensors 60, 61, 65, 66 are connected to pads 68, 69, 70, 71, 72, 74, 75, 76, 77, respectively. These pads 68 to 72 and 74 to 77 allow connection of the above members to an external circuit, etc.

Note that, although the intake-air temperature sensor 20 is not illustrated in the sensor element shown in FIG. 6, the intake-air temperature sensor 20 can be formed on the substrate 58 as with the example shown in FIG. 2.

As in the foregoing, according to the first embodiment of the present invention, the heating resistor type flow-measuring device is a drive circuit comprising a bridge circuit having: the heating resistor 2 and the thermoresistance 3 that are connected to each other in series, the group of the serially-connected resistors 6 to 11 that are connected to the heating resistor 2 and the thermoresistance 3 in parallel, and the amplifier 17 for adjusting the balance of resistance ratio; wherein a leading wire (leading terminal) is provided in each section between resistors of the group of the serially-connected resistors 6 to 11, and MOS transistors that act as switches for selecting any one of the leading wires and connecting it to one of the input terminals of the amplifier are provided to the group of the serially-connected resistors 6 to 11.

Because of this configuration, the MOS transistors can evade being included in the group of the resistors constituting the bridge circuit as a part thereof, and consequently a current hardly flows in the MOS transistors 12, 13, 14, 15, and 16. Therefore, even when the MOS transistors 12 to 16 have large ON resistance values, they hardly affect adjustment of resistance values of the bridge circuit. Because of this, the MOS transistors 12 to 16 whose sizes are small can be adopted, and accordingly the integrated circuit thereof can be of a small chip size.

Therefore, the present invention can realize an air flowmeter that is small-sized, lightweight, and yet capable of adjusting the heating temperature of the heating resistor according to the ambient temperature as well as making the initial adjustment.

Next, the driving circuit in the air flowmeter that is the second embodiment of the present invention will be described referring to FIG. 7. Since parts other than the above-mentioned parts in the configuration are the same as those in the first embodiment, figures and detailed description thereof will be omitted.

Figure 7:
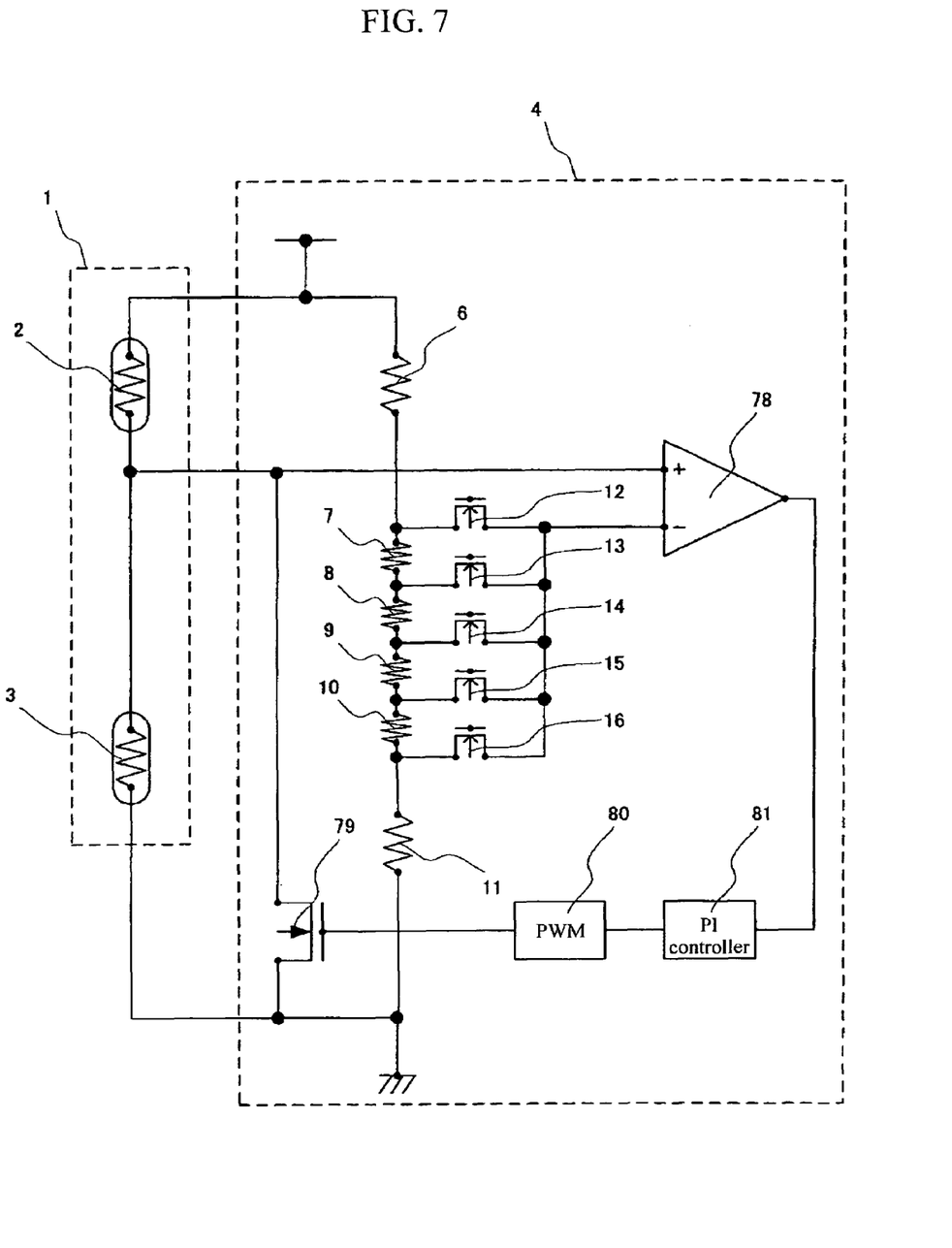
FIG. 7 is a block diagram of a drive circuit of the air flowmeter of a second embodiment.

In FIG. 7, the drive circuit comprises: the heating resistor 2 and the thermoresistance 3 that are arranged on the sensor element 1; a driving transistor 79 for driving the heating resistor 2 arranged on the integrated circuit 4; the group of the resistors (the resistors 6, 7, 8, 9, 10, 11) that are connected in parallel to a circuit consisting of the serially-connected heating resistor 2 and thermoresistance 3; the MOS transistors 12, 13, 14, 15, 16 that are connected to respective leading terminals of the group of the resistors 6 to 11.

The drive circuit further comprises: a comparator 78 for comparing the error voltage of the bridge circuit consisting of the heating resistor 2, the thermoresistance 3, and the group of the resistors 6 to 11; a PI controller 81 for performing integration proportional processing (sampling in a time division scheme) of an output of this comparator 78; and a PWM circuit 80 for generating a pulse waveform whose duty cycle varies in response to the output of the PI controller 81. An output signal of this PWM circuit 80 is fed to the gate of the driving transistor 79 (MOS transistor).

The source (drain) of the driving transistor 79 is connected to the midpoint of connection between the heating resistor 2 and the thermoresistance 3, and the drain (source) of the driving transistor 79 is connected to the midpoint of connection between the thermoresistance 3 and the resistor 11.

In the drive circuit according to the second embodiment of the present invention, as with the first embodiment, the heating resistor 2 is heated until the error voltage of the bridge circuit consisting of the heating resistor 2, the thermoresistance 3, and the group of the resistors, and its balanced state is maintained.

The heating temperature of the heating resistor 2 can be changed by selecting a particular MOS transistor among the MOS transistors 12, 13, 14, 15, 16 and turning it on. That is, by selecting an ON/OFF state for each of the MOS transistors 12, 13, 14, 15, 16 based on digital information, the temperature of the heating resistor 2 can be adjusted.

Therefore, also in this second embodiment, the same effect as that of the first embodiment can be achieved.

Naturally, the present invention can be applied to flowmeters for measuring the flow rate of other gases, such as hydrogen, as well as the flow rate of air.

In the example described above, the MOS transistor is used as switches for selecting connection between the group of the resistors 6 to 11 and the inverting input terminal of the amplifier 17. However, they are not limited to the MOS transistor, and other switching devices may be used.

What is claimed is:

1. A heating resistor type flow-measuring device that comprises a heating resistor for generating heat by a current flowing in it and a thermoresistance whose resistance value varies in response to the ambient temperature, and is for measuring the flow rate of a gas using heating of the heating resistor, wherein
   a series connection circuit is formed with the heating resistor and the thermoresistance,
   the heating resistor type flow-measuring device further comprising:
   a plurality of resistors connected to the series connection circuit in parallel; and
   at least two leading terminals connected to resistive connection points of the plurality of resistors.

2. A heating resistor type flow-measuring device that comprises a heating resistor for generating heat by a current flowing in it and a thermoresistance whose resistance value varies in response to the ambient temperature, and is for measuring the flow rate of a gas using heating of the heating resistor, wherein
   a series connection circuit is formed with the heating resistor and the thermoresistance,
   the heating resistor type flow-measuring device further comprising a plurality of resistors that are arranged outside the planar substrate and are connected to the series connection circuit in parallel.

3. The heating resistor type flow-measuring device according to claim 2, further comprising
   at least two leading terminals connected to resistive connection points of the plurality of resistors that are connected to the series connection circuit in parallel.

4. The heating resistor type flow-measuring device according to claim 2, wherein
   the planar substrate is a silicon substrate.

5. The heating resistor type flow-measuring device according to claim 1, further comprising:
   current adjusting means that inputs a first potential at a midpoint of connection between the heating resistor and the thermoresistance and a second potential at one of resistive junction points of the plurality of resistors, compares the first potential and the second potential, and controls a current flowing in the heating resistor; and
   switches that select any one of potentials of at least two leading terminals connected to resistive connection points of the resistors as an input signal to the current adjusting means.

6. The heating resistor type flow-measuring device according to claim 5, wherein
   the switches are MOS transistors.

7. The heating resistor type flow-measuring device according to claim 6, wherein
   the plurality of resistors connected to the series connection circuit in parallel are arranged on the same semiconductor chip on which the MOS transistors are arranged.

8. The heating resistor type flow-measuring device according to claim 3, further comprising:
   current adjusting means that inputs a first potential at a midpoint of connection between the heating resistor and the thermoresistance and a second potential at one of resistive junction points of the plurality of resistors, compares the first potential and the second potential, and controls a current flowing in the heating resistor; and
   switches that select any one of potentials of at least two leading terminals connected to resistive connection points of the resistors as an input signal to the current adjusting means.

9. The heating resistor type flow-measuring device according to claim 8, wherein
   the switches are MOS transistors.

* * * * *